United States Patent
Horak et al.

(10) Patent No.: US 11,742,114 B2
(45) Date of Patent: Aug. 29, 2023

(54) BUSHING FOR A MEDIUM VOLTAGE SWITCHGEAR

(71) Applicant: ABB Schweiz AG, Baden (CH)

(72) Inventors: Jakub Horak, Brno (CZ); Josef Cernohous, Jamne nad Orlici (CZ); Ctibor Kalab, Brno (CZ)

(73) Assignee: ABB Schweiz AG, Baden (CH)

(*) Notice: Subject to any disclaimer, the term of this patent is extended or adjusted under 35 U.S.C. 154(b) by 146 days.

(21) Appl. No.: 17/168,202

(22) Filed: Feb. 5, 2021

(65) Prior Publication Data
US 2021/0249161 A1  Aug. 12, 2021

(30) Foreign Application Priority Data

Feb. 6, 2020  (EP) .................................. 20 155 918

(51) Int. Cl.
*H01B 17/58*  (2006.01)
*H02B 1/015*  (2006.01)

(52) U.S. Cl.
CPC ........... *H01B 17/583* (2013.01); *H02B 1/015* (2013.01)

(58) Field of Classification Search
None
See application file for complete search history.

(56) References Cited

U.S. PATENT DOCUMENTS

| 4,432,036 | A * | 2/1984 | Zwillich | H02B 11/04 361/606 |
| 9,601,856 | B2 * | 3/2017 | Regantini | H01R 13/18 |
| 9,728,922 | B2 * | 8/2017 | Carera | H02B 11/04 |
| 2002/0079906 | A1 * | 6/2002 | Rashkes | G01R 15/14 324/544 |
| 2012/0037395 | A1 * | 2/2012 | Beutel | H02B 13/045 174/50 |
| 2014/0118885 | A1 * | 5/2014 | Jung | H02B 1/20 361/612 |
| 2015/0087177 | A1 * | 3/2015 | Carera | H01R 31/06 439/339 |

(Continued)

FOREIGN PATENT DOCUMENTS

| CN | 105098638 A | 11/2015 |
| CN | 105119178 A | 12/2015 |

(Continued)

OTHER PUBLICATIONS

Jay Shoemaker "Moldflow Design Guide A Resource for Plastics Engineers", Moldflow Design Guide, Dec. 31, 2006, p. 57, Moldflow Corporation, Framingham, Massachusetts (MA), U.S.A.

(Continued)

*Primary Examiner* — Binh B Tran
*Assistant Examiner* — Muhammed Azam
(74) *Attorney, Agent, or Firm* — Leydig, Voit & Mayer, Ltd.

(57) ABSTRACT

A bushing for a metal clad medium voltage switchgear includes a hollow body. The body is made of polyamide. A first end of the body connects to a compartment of the medium voltage switchgear. A second end of the body connects to a T-off and pin. A body portion extends from the first end of the body to the second end of the body. The body portion is circular shaped about an axis extending from the first end of the body to the second end of the body.

8 Claims, 3 Drawing Sheets

(56) References Cited

U.S. PATENT DOCUMENTS

| | | | | |
|---|---|---|---|---|
| 2015/0294804 | A1* | 10/2015 | Cortinovis | ............... H01H 1/06 |
| | | | | 200/279 |
| 2016/0190721 | A1* | 6/2016 | Regantini | ............... H01R 13/11 |
| | | | | 200/50.27 |
| 2018/0366925 | A1* | 12/2018 | Beaver | ................. H02B 13/005 |
| 2020/0075276 | A1* | 3/2020 | Malakhovskiy | ..... H01H 33/666 |

FOREIGN PATENT DOCUMENTS

| | | | | |
|---|---|---|---|---|
| CN | 204927924 | U | 12/2015 | |
| CN | 206727517 | U | 12/2017 | |
| CN | 113224648 | A * | 8/2021 | ............ H01B 17/583 |
| CZ | 297043 | B6 * | 8/2006 | ............. B29C 45/00 |
| DE | 4039340 | A1 * | 6/1992 | |
| DE | 4039340 | A1 | 6/1992 | |
| DE | 102004055103 | A1 * | 6/2005 | ............... H02G 3/22 |
| DE | 202009009851 | U1 | 9/2009 | |
| DE | 102010017440 | A1 * | 12/2011 | ................. F16L 5/02 |
| DE | 202011106907 | U1 * | 12/2012 | ......... B60R 16/0215 |
| DE | 102014016890 | A1 * | 5/2016 | ................ F16L 5/10 |
| DE | 202015104993 | U1 * | 2/2017 | |
| DE | 202016107121 | U1 * | 4/2017 | |
| EP | 0060058 | A1 * | 2/1982 | |
| EP | 0164023 | A2 * | 5/1985 | |
| EP | 1010584 | A2 * | 6/2000 | ......... B60R 16/0222 |
| EP | 1920451 | A1 | 5/2008 | |
| EP | 1958215 | A1 | 8/2008 | |
| EP | 2278601 | A1 | 1/2011 | |
| EP | 2407989 | A1 | 1/2012 | |
| EP | 2656997 | A1 | 10/2013 | |
| EP | 2656998 | A1 | 10/2013 | |
| EP | 3241658 | A1 | 11/2017 | |
| EP | 2346126 | B1 * | 7/2018 | ............ H02B 11/02 |
| EP | 3451474 | A1 | 3/2019 | |
| EP | 3483995 | A1 * | 5/2019 | ........... H02B 13/045 |
| EP | 3863135 | A1 * | 8/2021 | ........... H01B 17/583 |
| ES | 2604327 | T3 * | 3/2017 | ............. H02B 11/04 |
| KR | 820001348 | B1 * | 7/1982 | |
| KR | 200355333 | Y1 * | 6/2004 | |
| KR | 101333569 | B1 * | 11/2013 | |
| KR | 20150001209 | U * | 3/2015 | |
| KR | 20170056101 | A * | 5/2017 | |
| KR | 20200109039 | A * | 9/2020 | |
| RU | 177195 | U1 * | 2/2018 | |
| WO | WO-2010112462 | A2 * | 10/2010 | ........... H02B 13/045 |
| WO | WO-2014117354 | A1 * | 8/2014 | ........... H01R 25/162 |
| WO | WO-2016138975 | A1 * | 9/2016 | ......... B60R 16/0222 |
| WO | WO-2019096711 | A * | 5/2019 | ........... H02B 13/045 |

OTHER PUBLICATIONS

Bayer Material Science, "Engineering Polymers, Part and Mold Design, Thermoplastics: A Design Guide", Dec. 30, 2000, pp. 22-23, Bayer Materialscience LLC, Pittsburgh, Pennsylvania (PA), U.S.A.

* cited by examiner

BUSHING FOR A MEDIUM VOLTAGE SWITCHGEAR

CROSS-REFERENCE TO PRIOR APPLICATION

Priority is claimed to European Patent Application No. EP 20 155 918.4, filed on Feb. 6, 2020, the entire disclosure of which is hereby incorporated by reference herein.

FIELD

The present invention relates to a bushing for a medium voltage switchgear.

BACKGROUND

In a medium voltage switchgear (or panel) with metal partitions, bushings are important parts of the panel. Bushings, which can also be called spouts (1 per phase) or monoblocks (1 for all 3 phases), can for example be used with circuit breaker compartments.

FIG. 1 shows an existing epoxy bushing or spout, represented in a partial cut artform, where for example the spout is mounted by 4 screws to a metal plate, such as a contact support. This can form a partition between for example a circuit breaker compartment and other compartments in the switchgear or panel. The spout has an insert in the rear wall used for assembling T-offs and pin. The existing spout however is expensive, difficult to assemble, and large.

There is a need to address these issues.

SUMMARY

In an embodiment, the present invention provides a bushing for a metal clad medium voltage switchgear, comprising: a hollow body, wherein the body is comprised of polyamide, wherein a first end of the body is configured to connect to a compartment of the medium voltage switchgear, and wherein, a second end of the body is configured to connect to a T-off and pin.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved bushing (or spout) for a compartment of a medium voltage switchgear, such as an air or gas insulated switchgear.

It is to be noted that the bushing is described with respect to a medium voltage air or gas insulated switchgear, but finds utility in other situations for the connection of high voltage current carrying conductors between compartments.

In an aspect, there is provided a bushing for a metal clad medium voltage switchgear, the bushing comprising:

a hollow body.

The body is made from polyamide. A first end of the body is configured to connect to a compartment of a medium voltage switchgear. A second end of the body is configured to connect to a T-off and pin.

Thus the new bushing or spout is made from recyclable polyamide material, which is also lighter, and less expensive than existing bushings.

In an example, a body portion extends from the first end of the body to the second end of the body. The body portion is substantially circular shaped about an axis extending from the first end of the body to the second end of the body.

In an example, an outer surface of the body portion is chamfered such that the outer surface is angled to the axis in a direction from the first end of the body to the second end of the body.

In other words, the outer surface of the body does not have a constant circular radius but varies along its length. This improves water drainage in condensation conditions.

In an example, an internal surface of the body portion comprises at least one flow leader.

The flow leaders facilitate manufacture of the bushing.

In an example, the at least one flow leader is in a direction from the first end of the body to the second end of the body.

In an example, the second end comprises a substantially planar portion. At least one T-off and pin connection are located within the planar portion.

In an example, the planar portion has a separate T-off connection and a separate pin connection.

Having separate T-off and pin connections makes connection of the bushing simpler and easier.

In an example, an inner surface of the planar portion comprises at least one flow leader.

The flow leaders facilitate manufacture of the bushing.

In an example, an inner surface of the planar portion comprises at least one reinforcement part.

The reinforcement part or parts enable the overall thickness of the bushing to be reduced, with the overall weight of the bushing also being reduced, which also leads to reduced cost of the bushing.

In an example, the second end comprises a dielectric rim.

It is been found that the dielectric rim improves dielectric performance.

In an example, the first end of the body is configured to connect to the compartment of the switchgear via at least one assembly groove.

The above aspects and examples will become apparent from and be elucidated with reference to the embodiments described hereinafter.

Figure 1:
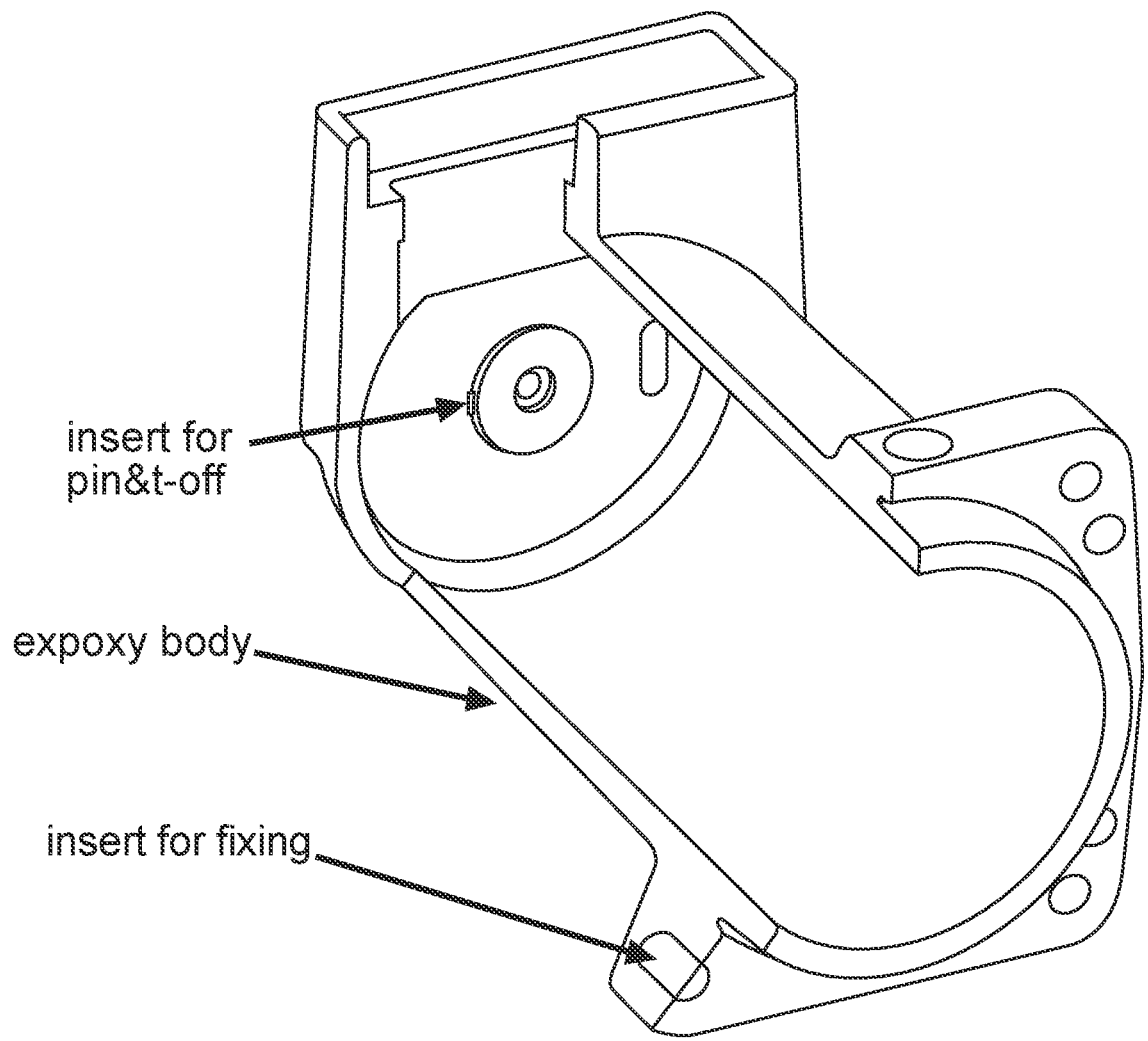
FIG. 1 shows a schematic representation of an example of an existing bushing or spout for a metal clad medium voltage switchgear.
Figure 2:
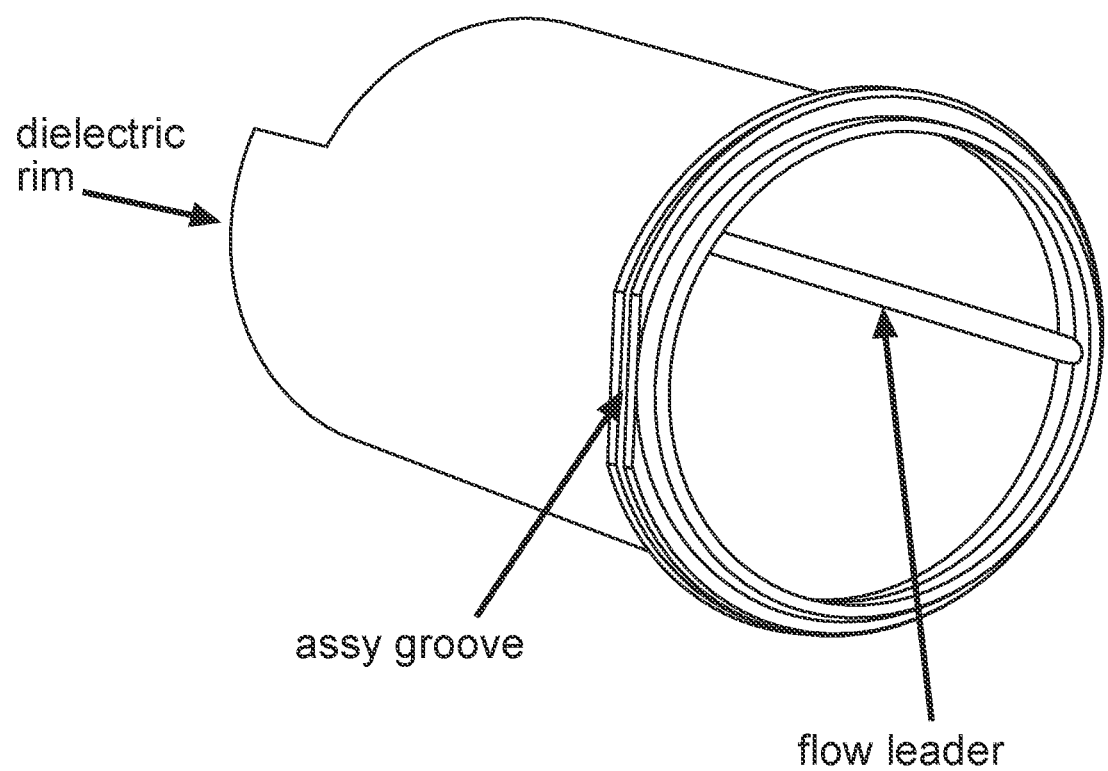
FIG. 2 shows an isometric view of a new bushing or spout for a metal clad medium voltage switchgear.
Figure 3:
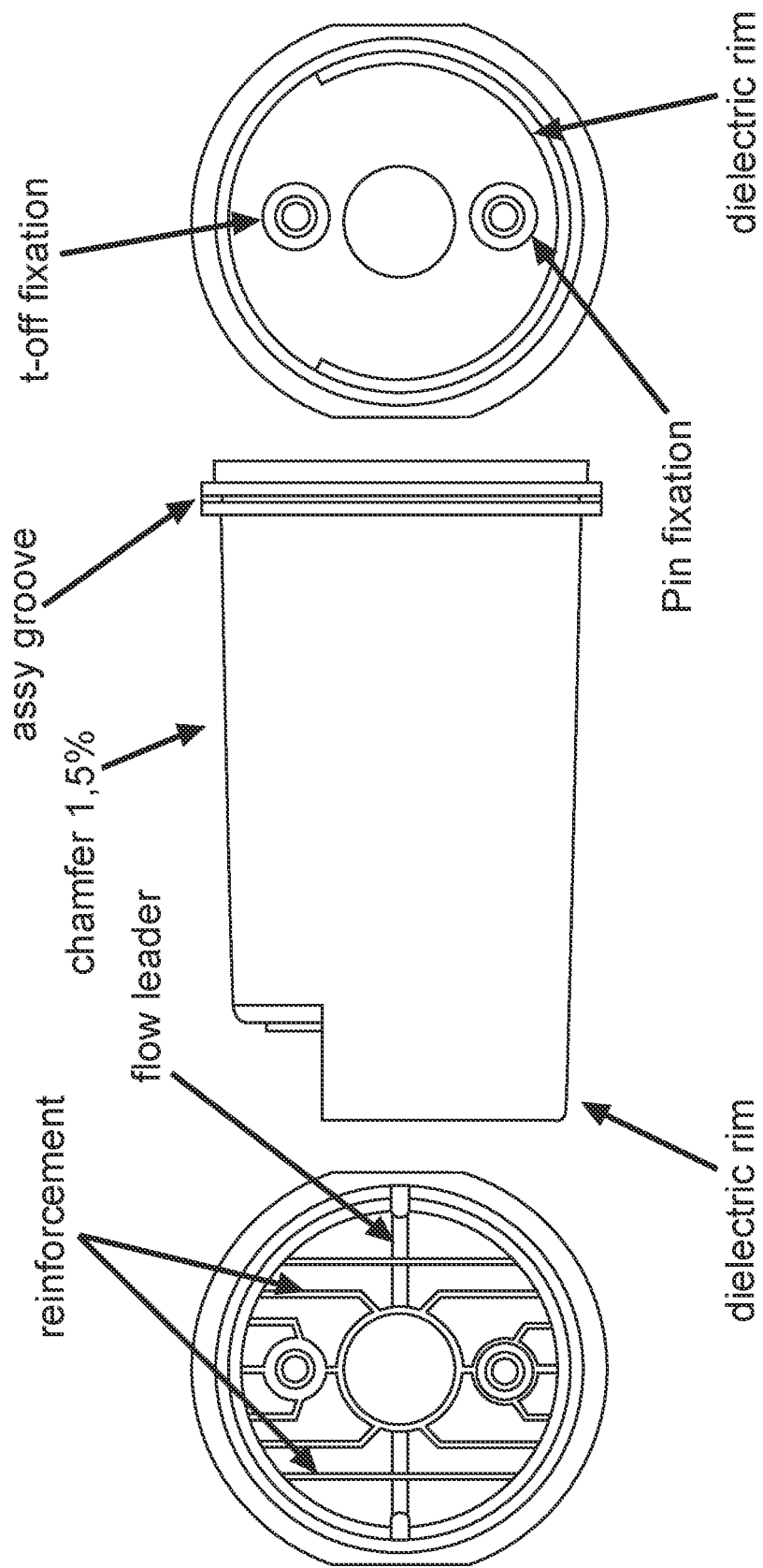
FIG. 3 shows front side and rear views of a new bushing or spout for a metal clad medium voltage switchgear.

FIGS. 2-3 relate to a new bushing or spout for a metal clad medium voltage switchgear. The bushing comprises a hollow body. The body is made from polyamide. A first end of the body is configured to connect to a compartment of a medium voltage switchgear. A second end of the body is configured to connect to a T-off and pin.

According to an example, a body portion extends from the first end of the body to the second end of the body. The body portion is substantially circular shaped about an axis extending from the first end of the body to the second end of the body.

According to an example, an outer surface of the body portion is chamfered such that the outer surface is angled to the axis in a direction from the first end of the body to the second end of the body.

The body portion can be wider at the first end with respect to the second end.

According to an example, an internal surface of the body portion comprises at least one flow leader.

According to an example, the at least one flow leader is in a direction from the first end of the body to the second end of the body.

Thus as shown in the figures, the flow leader can extend along the shortest distance of the inner surface of the body portion.

According to an example, the second end comprises a substantially planar portion. At least one T-off and pin connection are located within the planar portion.

According to an example, the planar portion has a separate T-off connection and a separate pin connection.

According to an example, an inner surface of the planar portion comprises at least one flow leader.

According to an example, an inner surface of the planar portion comprises at least one reinforcement part.

According to an example, the second end comprises a dielectric rim.

According to an example, the first end of the body is configured to connect to the compartment of the switchgear via at least one assembly groove.

As shown in FIGS. 2-3, one end of the bushing as a dielectric rim that provides better results in dielectric tests. An assay or assembly groove or grooves is provided to enable connection to a compartment of the switchgear without requiring screws or bolts, with an internal flow leader extending along an inner surface of the body of the bushing, which facilitates manufacture. The inner rear surface also has a flow leader, and reinforcement profiles designed through simulation, with simulation taking into account the properties polyamide and deriving the optimised design described here. The body of the bushing is slightly tapered or chamfered, providing for improved drainage in condensation conditions. Separate T-off and pin connections are provided in the rear of the bushing thereby facilitating connection Thus, the new bushing or spout is made from recyclable polyamide material, with computer simulations used to design reinforcements providing for maintenance of structural integrity for less overall material. The new design has phase pitch as low as 133 mm, with independent t-off and pin assemblies, and with flowleaders for improved manufacturability. The new bushing features a fastener-less assembly (partial), with a built-in dielectric rim, with a chamfer of 1.5% for improved drain in condensation conditions. The design can therefore be silicone-free, and has lower weight and lower cost with respect to the existing bushings.

Bushings are important components of metal-clad switchgear. Existing bushings or spout are screw-mounted, and made of epoxy. The new bushing provides for partially fastener-free assembly (easier, faster), has advantage in improved drainage (increased reliability), weight (green) and cost, uses and recyclable thermoplastics (green).

Thus, the new bushing provides significant improvements over existing epoxy or epoxide bushings or spouts.

The new design of bushing has used simulation and modelling taking into account material properties of polyamide, and also designing in reinforcements and flow leaders to provide optimum wall thicknesses, reduce weight and increase strength of design and facilitate manufacture.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A bushing for a metal clad medium voltage switchgear, comprising:
    a hollow body,
    wherein the body is comprised of polyamide,
    wherein a first end of the body is configured to connect to a compartment of the metal clad medium voltage switchgear,
    wherein, a second end of the body has separate T-off and pin connections configured to connect to a T-off and pin,
    wherein a body portion extends from the first end of the body to the second end of the body, and wherein the body portion is substantially circular shaped about an axis extending from the first end of the body to the second end of the body, and
    wherein an outer surface of the body portion is tapered or chamfered such that the outer surface of the body portion is angled to the axis in a direction from the first end of the body to the second end of the body, and wherein the body portion is wider at the first end with respect to the second end.

2. The bushing according to claim 1, wherein an internal surface of the body portion comprises at least one flow leader.

3. The bushing according to claim 2, wherein the at least one flow leader is in a direction from the first end of the body to the second end of the body.

4. The bushing according to claim 1, wherein the second end of the body comprises a planar portion, and
    wherein at least one of the T-off and pin connections are located within the planar portion.

5. The bushing according to claim 4, wherein an inner surface of the planar portion comprises at least one flow leader.

6. The bushing according to claim 4, wherein an inner surface of the planar portion comprises at least one reinforcement part.

7. The bushing according to claim 1, wherein the second end of the body comprises a dielectric rim.

8. The bushing according to claim 1, wherein the first end of the body is configured to connect to the compartment of the metal clad medium voltage switchgear via at least one assembly groove.

* * * * *